United States Patent Office.

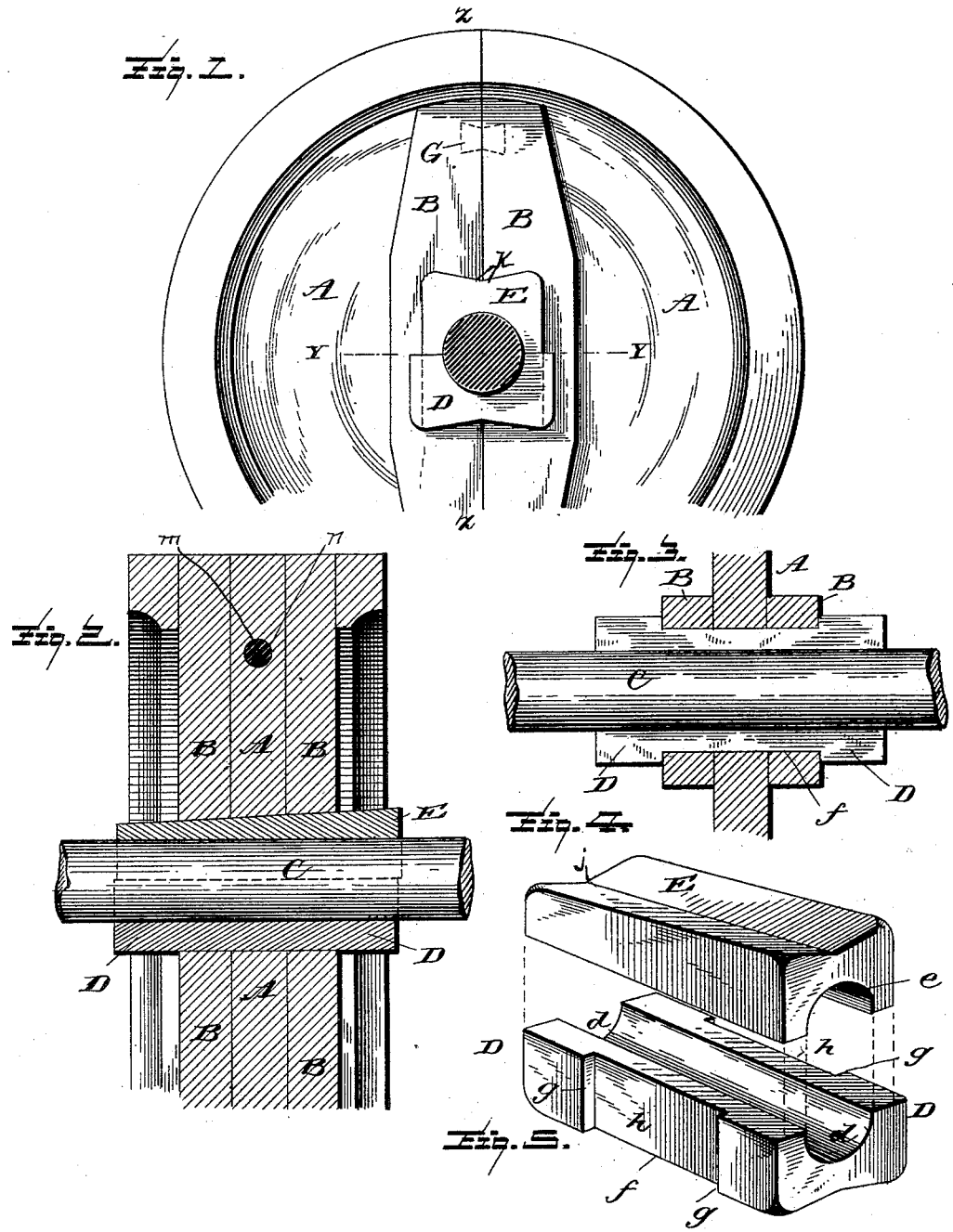

AVERIT W. MICHAEL, OF BENTON HARBOR, MICHIGAN.

PULLEY.

SPECIFICATION forming part of Letters Patent No. 426,036, dated April 22, 1890.

Application filed January 24, 1890. Serial No. 337,938. (No model.)

*To all whom it may concern:*

Be it known that I, AVERIT W. MICHAEL, a citizen of the United States, residing at Benton Harbor, in the county of Berrien and State of Michigan, have invented certain new and useful Improvements in Pulleys; and I do hereby declare that the following is a full, clear, and exact description of the same, reference being had to the annexed drawings, making a part of this specification, and to the letters of reference marked thereon.

This invention relates to certain new and useful improvements in split pulleys; and it has for its object, among others, to provide a simple and cheap split pulley easily applied to the shaft without the employment of bolts or screws, the core of the pulley aiding in forming a solid center for the hub, and also gives a solid foundation, to which the remainder of the rim may be fastened.

Other objects and advantages of the invention will hereinafter be made apparent, and the novel features thereof will be specifically pointed out in the appended claims.

The invention is clearly illustrated in the accompanying drawings, which, with the letters of reference marked thereon, form a part of this specification, and in which—

Figure 1 is a face view of my improved pulley, shown upon a shaft, which is shown in section. Fig. 2 is a section through the line $z z$ of Fig. 1. Fig. 3 is a section on the line $y y$ of Fig. 1. Fig. 4 is a perspective view of the means employed for securing the pulley to the shaft, and at the same time holding the parts of the pulley together.

Like letters of reference indicate like parts throughout the several views.

Referring, now, to the details of the drawings by letter, A designates the two like portions or halves of the pulley, which is composed of dressed lumber in layers, as shown best in Fig. 2, the adjacent edges of the two halves being provided with an opening or passage for the shaft and its securing means. These openings are undercut or dovetailed, and upon each side of the pulley are re-enforced by the pieces B. The adjacent faces of the two halves near their peripheries are provided with pins $m$ and holes $n$ to receive the same.

C designates the shaft to which the pulley is secured.

The securing means which serves to hold the two parts of the pulley together and to hold the same to the shaft are shown most clearly in Fig. 4, and consist of the block D, having a substantially semicircular recess $d$, extending lengthwise thereof, to embrace the shaft upon one side, and the wedge-shaped block E, provided with a longitudinal semicircular recess $e$ to embrace the other side of the shaft. Upon opposite sides of the block D the same is cut away, as shown at $f$, to form shoulders $g$ and a recess $h$, as shown best in Fig. 4.

In practice the two halves of the pulley are placed around the shaft and the block D placed in one of the openings in one of the halves, the shoulders preventing displacement thereof, the recesses $h$ receiving the adjacent portions of the half of the pulley upon which it is secured. This block, when once in place, is designed to remain permanently attached to its half. When the parts have been thus secured, the wedge-shaped block E is then forced into the opening in the other half and driven up. The outer faces of the two blocks are formed, as shown in Figs. 1 and 4, with a recess $j$, inclined from opposite sides inward and adapted to receive a corresponding ridge or tenon $k$ on the adjacent halves of the pulley, as shown in Fig. 1. The parts thus secured are secure and cannot be accidentally displaced, yet allow of ready removal when it is desired to remove the pulley. As the wedge is driven up, it forces or pulls the pulley toward the shaft. In large pulleys to keep them from spreading I employ a double dovetailed securing or holding piece, as shown by dotted lines at G in Fig. 1.

What I claim as new is—

1. The combination, with the two halves of the pulley having openings for the passage of the shaft, of the two pieces upon opposite sides of the said openings and formed with wedge-shaped projections, the block D, formed upon opposite sides with recesses $h$ and shoulders $g$, and the wedge-shaped block having a wedge-shaped recess engaging the wedge-shaped projections on the aforesaid pieces, as set forth.

2. The combination, with the two halves of the pulley having passage-way for the shaft, and the pieces on the outer faces of the halves adjacent to the passage-way therein and formed upon opposite sides with wedge-shaped projections, of the block having a longitudinal recess to embrace the shaft and upon its outer longitudinal face formed with a recess having oppositely-inclined sides, and the wedge-shaped block E, formed along its inner edge or face with a recess to embrace the shaft and upon its other or outer face with a longitudinal wedge-shaped recess, and the double dovetailed holding-piece G, substantially as and for the purpose specified.

In testimony that I claim the above I have hereunto subscribed my name in the presence of two witnesses.

AVERIT W. MICHAEL.

Witnesses:
G. M. VALENTINE,
WM. E. SHEFFIELD.